June 17, 1930.  G. F. MATTESON  1,763,799
MOP MAKING MACHINE
Filed May 2, 1925   5 Sheets-Sheet 1
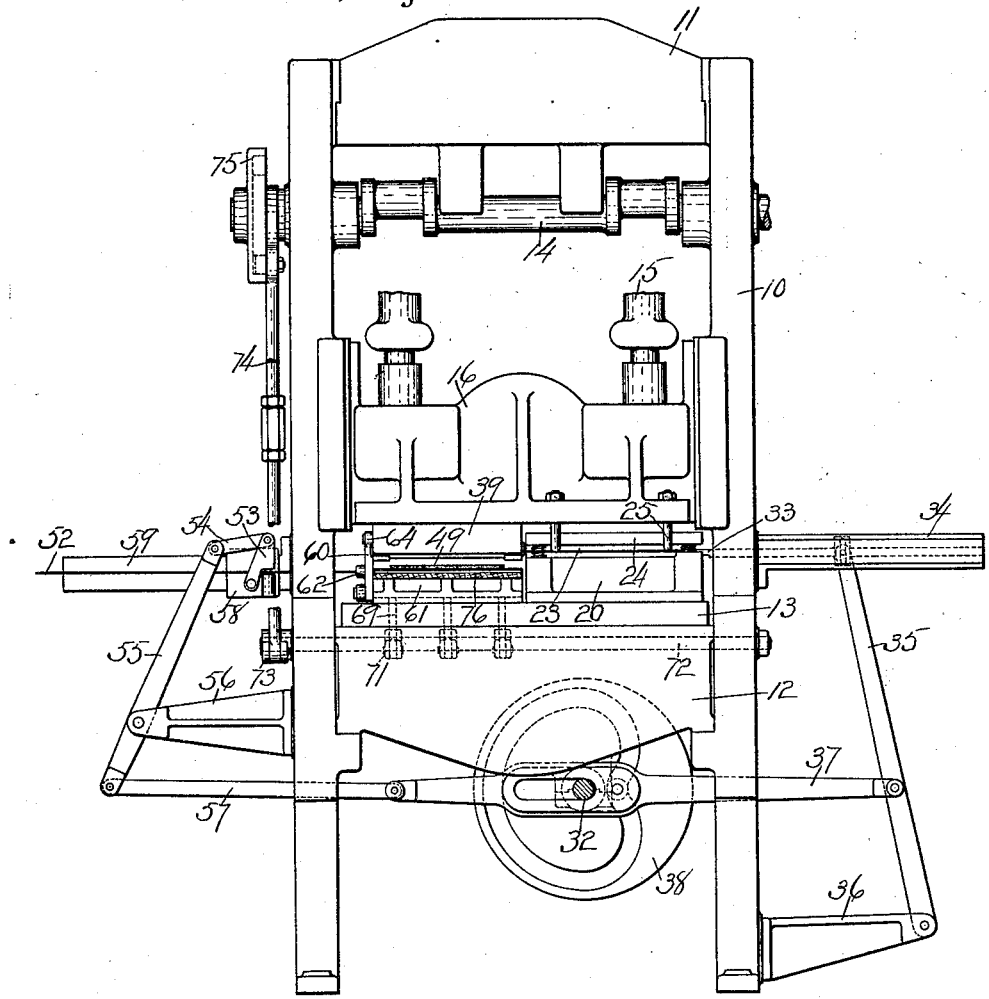
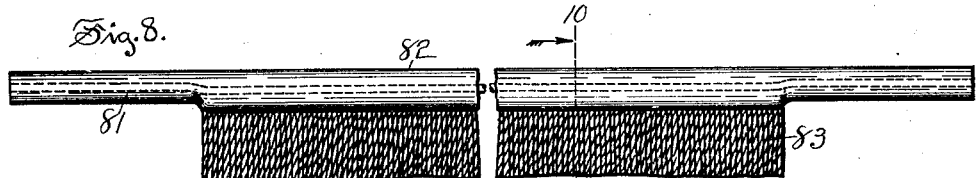
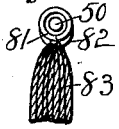

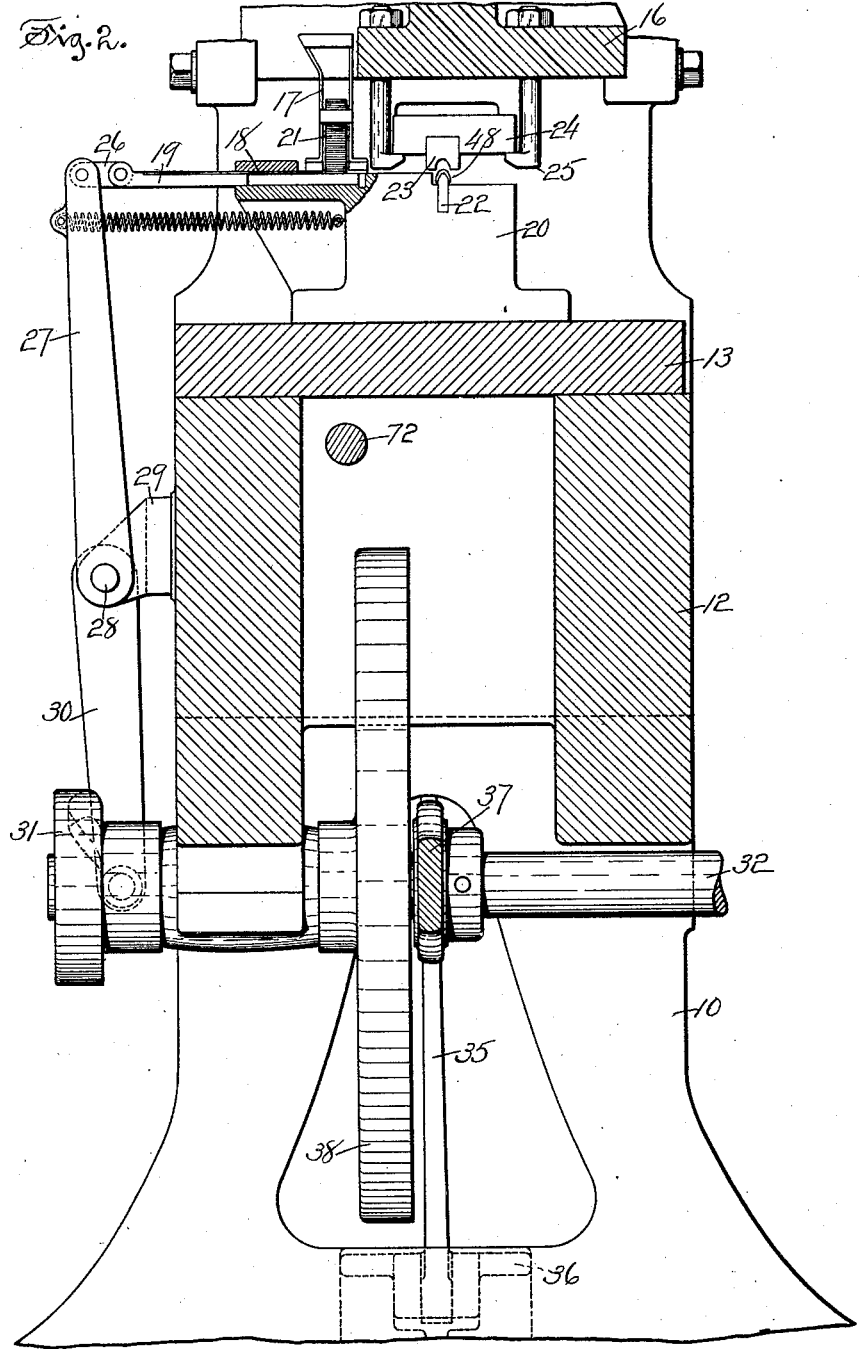

June 17, 1930.  G. F. MATTESON  1,763,799
MOP MAKING MACHINE
Filed May 2, 1925   5 Sheets-Sheet 3
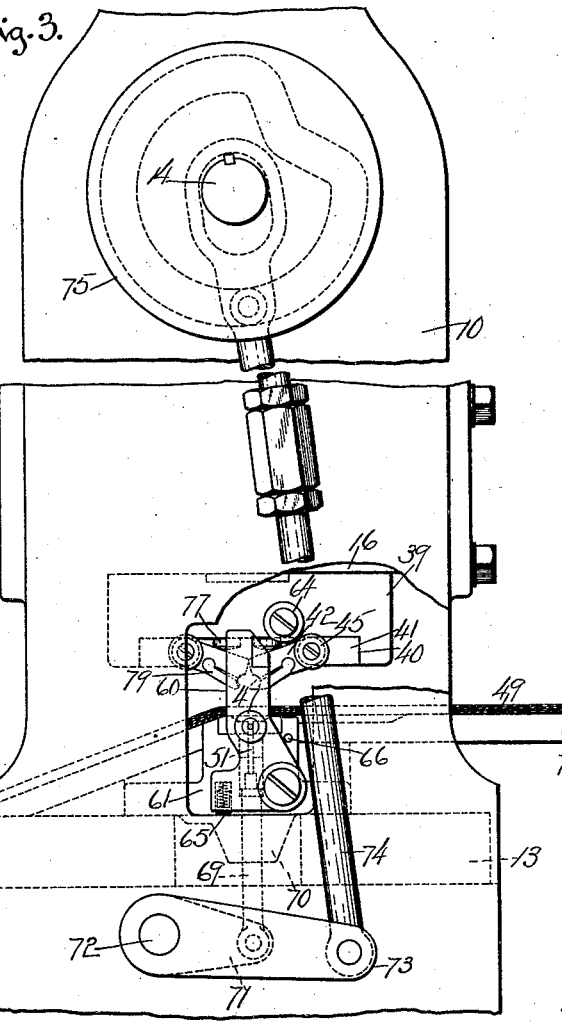
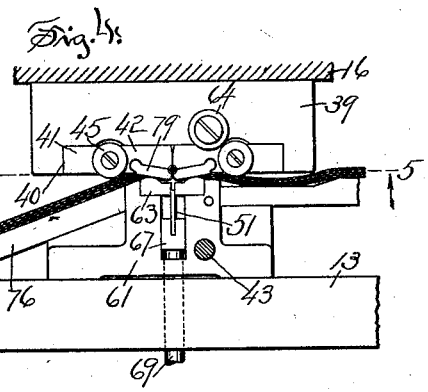
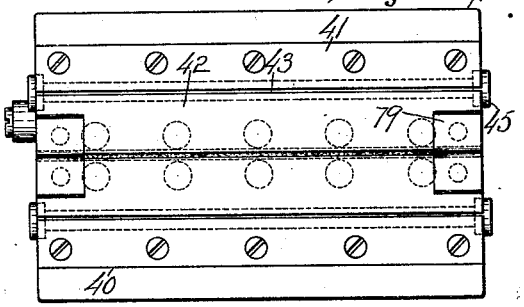

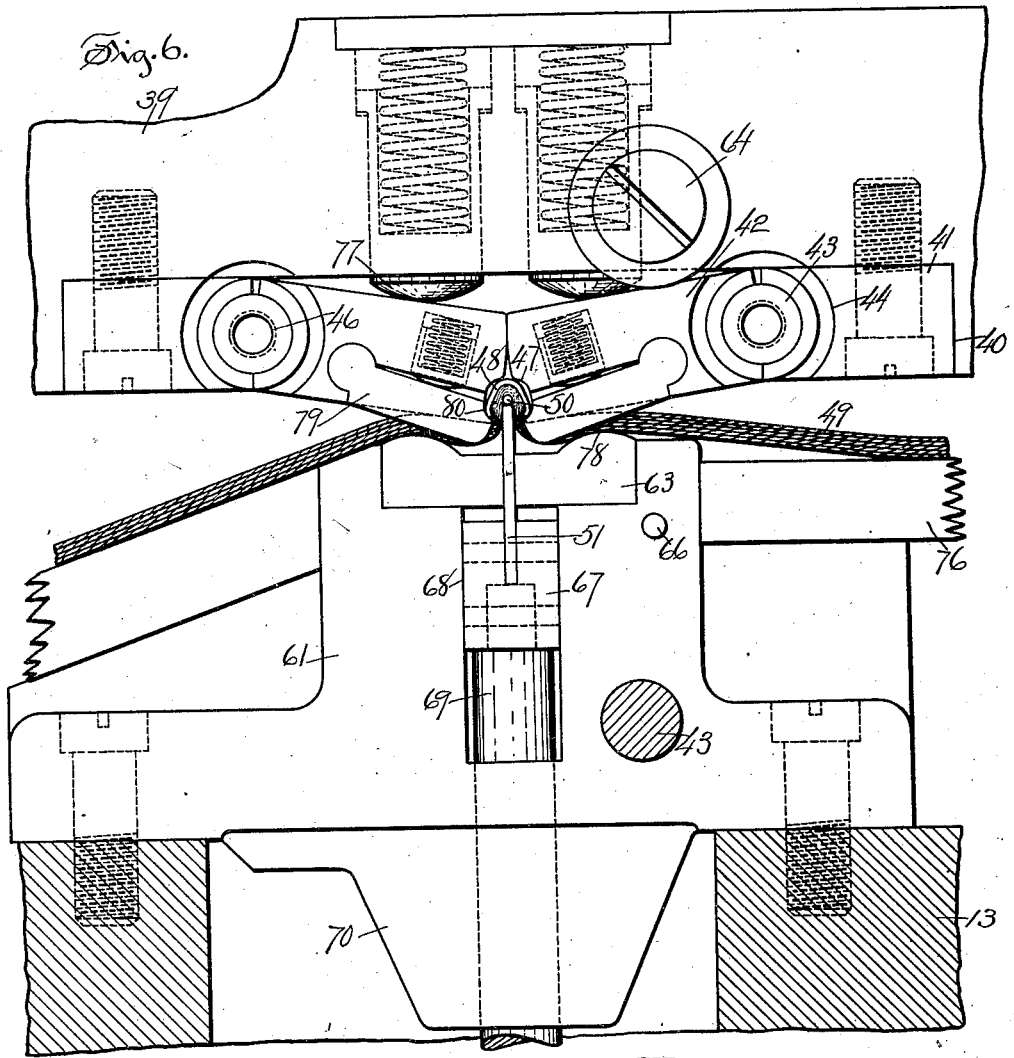
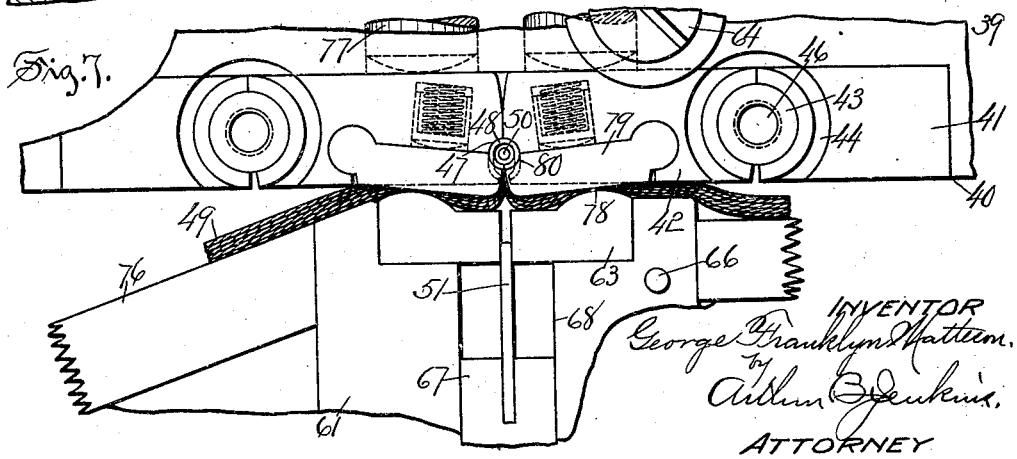

June 17, 1930.  G. F. MATTESON  1,763,799
MOP MAKING MACHINE
Filed May 2, 1925  5 Sheets-Sheet 5
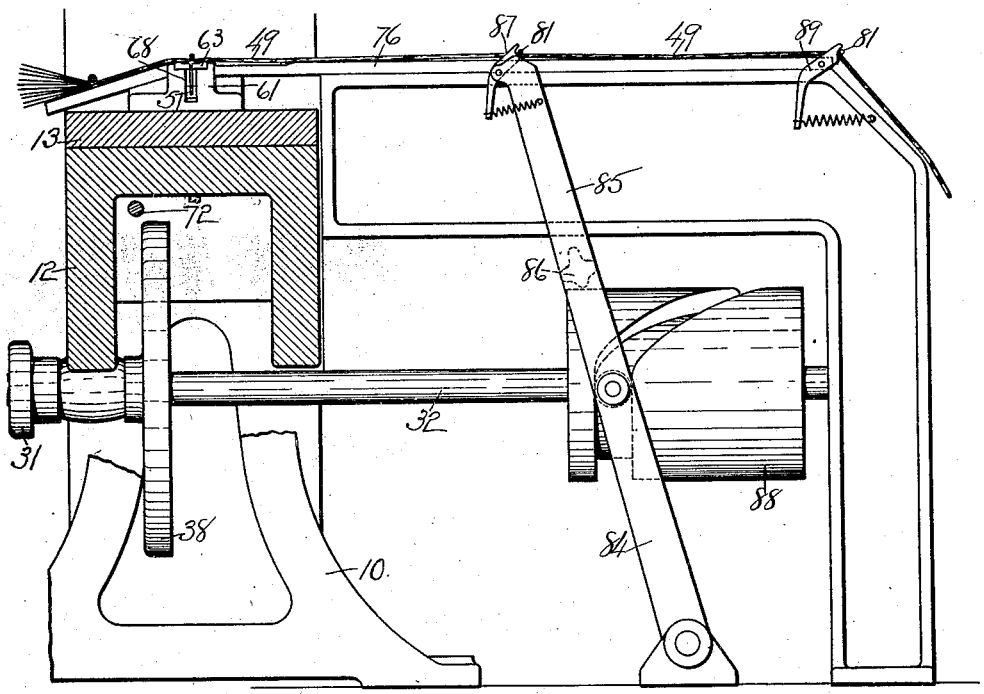
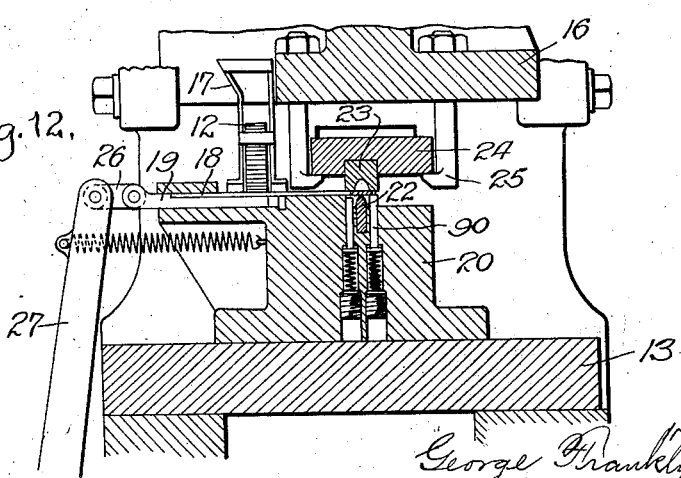

Patented June 17, 1930

1,763,799

UNITED STATES PATENT OFFICE

GEORGE FRANKLYN MATTESON, OF ROCKY HILL, CONNECTICUT, ASSIGNOR TO THE FULLER BRUSH COMPANY, OF HARTFORD, CONNECTICUT, A CORPORATION OF CONNECTICUT

MOP-MAKING MACHINE

Application filed May 2, 1925. Serial No. 27,574.

My invention relates to machines for making mops, or similar articles, composed of mop material in the form of coarse threads, and an object of my invention, among others, is the production of a machine of this class in which mops of this character may be rapidly formed in a particularly efficient manner.

One form of machine embodying my invention and in the construction and use of which the objects herein set out, as well as others, may be attained, is illustrated in the accompanying drawings, in which—

Figure 1 is a view in front elevation of a machine embodying my invention, with parts broken away to show construction.

Figure 2 is a view, scale enlarged, in cross section through a portion of the machine illustrating the construction and operation of the feeding mechanism.

Figure 3 is a side view, looking from the left of Figure 1, with parts broken away to show construction.

Figure 4 illustrates an end view of the blank closing dies.

Figure 5 is a view on the plane denoted by the dotted line 5—5 of Figure 4.

Figure 6 is a view, scale enlarged, illustrating the construction and operation of the blank closing dies which are shown in an intermediate position.

Figure 7 is a similar view of a portion of the mechanism shown in Figure 6, but with the closing dies shown in their closed position.

Figures 8, 9 and 10 (Sheet I) are detail views illustrating a mop structure formed by the operation of my improved machine, Figure 10 being a section on a plane denoted by the dotted line 10—10 of Figure 8.

Figure 11 is a detail view, illustrating means for removing the brush structures from the forming mechanism, some of the parts being broken away to show construction and other parts being removed, the upper end of the forming lever being at the opposite end of its path of travel from that occupied by it when the mechanism is in the position shown in Figure 1.

Figure 12 is a detail view illustrating the means for supporting a flat blank upon the forming punch.

In the accompanying drawings the numeral 10 denotes the side parts of my improved machine, 11 a cross head connecting the side parts at the top, 12 a bed connecting the side parts at a point lower down and 13 a bed plate supported on the bed. A crank shaft 14 mounted in the upper ends of the side parts may be driven in any suitable manner, said shaft being connected as by means of pitmen 15 (shown as broken off in Figure 1) with a plunger head 16 mounted for vertical reciprocating movement in the side parts 10, in a manner common to devices of this class.

My improved machine effects the formation of trough shaped pieces from thin metal comprising flat blanks 21 that are supplied in any suitable manner, in the construction herein shown such blanks being deposited in a hopper 17 and successively moved therefrom as by blank pushers 18 in the form of fingers secured to and projecting from the front ends of blank pusher supports 19 each mounted for sliding movement in a projection from a die block 20 supported on the bed plate 13, and as shown in Figure 2 of the drawings. These flat blanks 21 are received upon a punch 22 secured to and projecting upwardly from the die block 20 and upon which punch they are bent into trough shape by means of a die 23 secured to a die plate 24 supported upon hooks 25 projecting downwardly from the plunger head 16, and by means of which head the die 23 is forced against a blank on the punch 22 to impart trough shape to it. Said blanks may be supported upon the ends of yieldingly mounted pins 90 located in sockets in the die block 20 and as shown in Figure 12 of the drawings, and which pins are moved downwardly into their sockets when the die 23 bends a blank over the form 22, and which pins immediately resume the position shown in Figure 12 when the formed blank is removed from the die 22. The end of one of the pins may be reduced to form a stop and provide a shoulder upon which the edge of the blank may rest.

Each blank pusher is connected by a link 26 with one of the branches 27 of a blank pusher lever, said lever being pivoted on a shaft 28 mounted in a bracket 29 on the back of the bed 12, said lever further comprising an operating arm 30 secured to said shaft and projecting into engagement with a pusher operating cam 31 secured to a cam shaft 32 suitably mounted in bearings in the frame, and as shown in Figure 2 of the drawings. It will be understood that there are two pushers of the same construction as just described which said pushers are each connected with one of the branches 27.

A transferring pusher 33 is mounted for reciprocating movement on a supporting arm 34 extending from one of the side parts 10, said pusher having a sliding reciprocating movement in said arm effected by means of a transfer lever 35 pivoted at its lower end to a bracket 36 secured to one of the side parts, said lever being actuated by a connecting rod 37 operated by means of a cam 38 secured to the cam shaft 32, and as shown in Figure 1 of the drawings. It will be understood that the cams 31 and 38 are properly formed to impart timely reciprocating movements to the blank pusher 18 and transfer pusher 33 between successive reciprocating movements of the plunger head 16, the formed blank being removed by the pusher 33 from the punch 22, in a manner to be hereinafter described, and immediately following this a flat blank being placed by the blank pusher 18 on the punch 22, after which the plunger head 16 is operated to bend the blank into trough shape.

A head block 39 is secured to the under side of the plunger head 16, this block having a recess 40 in its under surface extending from end to end and in each side of this recess is secured a former support 41 for a body former 42, said supports extending from end to end of said recess, and as shown in Figure 5 of the drawings. A pivot 43 is located in the recessed edge of each of the supports, said pivots also being located in the recessed edges of said formers 42. An annular recess 44 is formed in the members 41 and 42, and as shown in Figures 6 and 7 of the drawings, in which recess the flange of a connecting cap 45 is located, said cap being held in place as by means of a screw extending through the cap and into a threaded hole 46 in the pivot 43. The body formers 42 have their adjacent edges formed on curves to permit said edges to swing in contact, and as illustrated in Figures 6 and 7 of the drawings, and said edges are provided with complemental parts of a forming recess 47 extending from end to end of said body formers.

After the flat blanks 21 have been formed into trough shape to produce such blanks 48, as hereinbefore described, they are moved lengthwise along the punch 22 into the forming recess 47, the upper edge of the punch 22 being located in line with said recess. The blanks are transferred by the pusher 33, as hereinbefore described, and when the plunger head 16 is in a raised position. After the blanks are located in the recess 47 and before they are closed, mop material 49 is forced into the trough shaped blank, together with a core 50 comprising a piece of wire, by the action of a punch plate 51.

The core 50 is formed from the end of a piece of wire 52 that may be extended from a reel or other support, this wire 52 being engaged by a feeding jaw 53 connected by a link 54 with a feeding lever 55 pivoted to an arm 56 extending from a frame part 10, said lever 55 being operated by a connecting rod 57 extending and pivotally attached to the end of the connecting rod 37, and as shown in Figure 1 of the drawings. The jaw 53 is mounted on a feed block 58 supported for sliding movement on an arm 59 extending from a side part 10 of the machine. It is noted that the pivot of the lever 35 is at the end of said lever while the pivot of the lever 55 is intermediate its ends, and that the connecting rods 37 and 57 are so attached to said levers that each reciprocating movement of the rod 37 causes the pusher 33 and feed block 58 to be moved in opposite directions, with a result that the wire 52 and blanks 48 are simultaneously moved toward each other. A single cam is thus utilized for operating the blank transfer and the wire feed.

The wire 52 is extended through an opening in the side part 10, and through a hardened bushing in a cut-off lever 60 pivotally attached at its lower end to a supporting block 61 mounted on the bed plate 13 in line with the die block 20. The bushing above referred to serves as a cutter 62 that acts in connection with shearing blocks 63 secured in a recess in the upper edge of the supporting block 61, and as shown in Figures 6 and 7 of the drawings, to cut off the end of the wire 52 and thereby produce the core 50. The lever 60 is actuated by means of a cutter actuating stud 64 projecting from the end of the head block 39 and having a roller that engages with a beveled end of the lever (see Figure 3) in each downward movement of the head block, the lever being returned to its normal position by means of a spring actuated plunger 65 in which position said lever rests against a stop pin 66. The blocks 63 are spaced sufficiently for entrance of the wire 52 and also for the reception of the punch 51, the wire being projected between the blocks 63 and upon upon the upper edge of the punch 51 when the latter is in its lowered position, as shown in Figure 7.

It will be understood that the feeding of the wire and the operation of the several parts, as hereinbefore described, takes place at the proper times to effect the described purposes. The mop material 49 is located over the core 50, as hereinabove described, lying on a table 76 on opposite sides of the core, and this material may be located on the core in any suitable manner. Said material is composed, usually, of cotton threads and these may be extended in a mass from continuous lengths by any suitable mechanism for feeding them or otherwise, as may be considered desirable.

The punch plate 51 is preferably of a length substantially that of the recess 40 in the head block 39, and its lower edge is secured in a groove in a punch plate block 67 mounted for vertical sliding movement in a slot 68 in the supporting block 61, and as shown in Figure 6 of the drawings. Plungers 69 extend upwardly through openings in a bearing projection 70 extending downwardly from the bottom of the supporting block 61, all of said plungers being pivotally attached to plunger operating arms 71 secured to and extending from a plunger actuator 72 in the form of a rock shaft pivotally mounted in the side parts 10 and having an actuating arm 73 connected by a rod 74 with a cam 75 secured to the crank shaft 14.

The body formers 42 are forced downwardly by spring pressed plungers 77 located in recesses in the head block 39 and as shown in dotted lines in Figure 6 of the drawings, and said body formers are forced upwardly by contact with ribs 78 on the shearing blocks 63 as the head block is forced down in the operation of the plunger head 16, the upward swinging movement of the body formers closing the edges of the trough shaped blanks tightly against opposite sides of the mop material to securely fasten the latter in place.

End formers 79 are pivotally attached to each body former at opposite ends thereof, these end formers being comparatively narrow and they are arranged in pairs, each pair comprising two formers located at the same ends of the body formers, and as shown in Figures 6 and 7 of the drawings. Each end former of each pair is recessed on that end adjacent to the end of the other end former of the pair, these complemental recesses comprising end forming recesses 80 at each end of the body formers. The ends of the members of each pair of end formers are closed together in the swinging movement of the end formers caused by contact with the ribs 78 in the downward movement of the head block 39, as hereinbefore described, the recesses 80 acting in connection with the recesses 47 to compress the edges of the blanks 48 at the ends 81 of the mop frame together, and as shown in Figure 9, while the edges of the body part 82 are spaced apart owing to the presence of the mop mass 83 therebetween, such mass, however, being securely clamped between said edges and the ends 81 of the structure being reduced in size as compared with that of the body part. It will be noted that the end forming recesses 80 and the ends of the forming recesses 47 comprise a complete recess in which an end 81 of the structure is formed.

It being assumed that the plunger head 16 is in its raised position, a mop having just been formed thereby and a blank 48 also having just been formed, as shown in Figure 2 of the drawings, the finished mop will be dropped from the forming device and may be removed in any suitable manner, mechanically or manually. The pusher 33 and the feed block 58 are simultaneously moved toward each other, the former to transfer a trough shaped blank from the punch 22 into the recess 47, and the latter to deliver a length of wire 52 between the blocks 63 and on the top edge of the punch plate 51. The pusher 18 is now promptly actuated to deliver a blank 21 on to the punch 22.

Mop material 49 is extended in any suitable manner across the wire over the top of the punch plate 51 and underneath the blank in the recess 47. The mechanism now acts to lower the head 16, and simultaneously therewith to raise the punch plate 51 with a wire 52 thereon underneath the mop material 49, the latter being doubled by the wire as it is pushed into the recess 47. As the head 16 moves downwardly the body formers 42 and the end formers 79 are carried against the ribs 78, thereby swinging said formers together to exert a pinching hold upon the mop material and wire sufficient to retain them in the recess while the punch plate is being withdrawn, this latter action taking place before the formers exert any material pressure upon said punch plate. The continued downward movement of the head 16 causes the formers to be swung together, thereby closing the body part 82 of the mop frame tightly against the mop material, and the ends of said frame closely together, as hereinbefore described. This downward movement of the head also forms the blank on the punch 22 into trough shape and also severs the wire that at this time is resting underneath the mop material.

The continued operation of the machine causes the head 16 to be raised, whereby the formers are swung apart and the mop structure drops therefrom ready for removal, during which another operation of the machine as just described takes place.

It will be understood that the cams 38, 75 and the crank shaft 14, as well as other parts of the machine are so formed and timed relatively one to another as to accomplish the operations herein set forth.

As will be understood from the foregoing description, the mop material comprises a mass of threads, usually of cotton, each of which is extended into the mass 49 from a number of reels or other devices upon which the threads are wound, and it will be further understood that this mass is supplied to the forming devices by mechanism that draws such mass into position to be acted upon by said forming devices, said mechanism, therefore, at the same time, comprising means for removing the formed structures, as hereinafter mentioned.

This mass of threads, in the structure herein shown, is moved by means of a thread moving lever 84 pivotally mounted at its lower end and including two branches 85—86, the former of which is an extension of the main part 84 and the latter of which is extended across the machine and then upwardly parallel with the portion 85, this extension not being shown in the drawings herein. The upper end of each of these levers contains a feeding detent 87, which detents are maintained in their operative positions by means of springs, but which may be depressed against the tension of said springs in a manner that will be readily understood, said detents being shown in Figure 11 of the drawings. A cam 88 secured to the cam shaft 32 is employed for imparting reciprocating movement to the lever 84. A holding detent 89 is pivotally mounted on the frame of the machine and is of a similar construction to the detent 87 except that the former is mounted on a stationary part of the machine.

In the operation of this mechanism the detents 87 when swung backwardly will pass underneath the projecting ends 81 of the brush structure, said detents then rising so that said ends are located in the path of forward movement of said detents. During this backward movement of the detents the material 49 is held from backward movement by reason of the engagement of the ends 81 further along in the mass with the detents 89. In the forward movement of the lever 84 the mass of material 49 is moved forward, this operation taking place at some time between the release of the mass of material from the forming devices and its reengagement by said forming devices. From this it will be seen that the formed mop structures are removed from the forming mechanism by a step-by-step movement.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:—

1. A mop making machine including means for forming a grooved blank, means for moving a blank into operative position with respect to the first means, means for moving the grooved blank, means for feeding a wire, a single actuating member for simultaneously operating said grooved blank moving means and said wire feeding means in opposite directions to associate a grooved blank and wire in connection with a thread mass, means for locating said wire and thread mass in said grooved blank, and means for closing the sides of the grooved blank together to secure said thread mass.

2. A mop making machine including a plunger head, a bed plate, means on said plunger head and bed plate for shaping a blank, means on said plunger head and bed plate for holding in position for assembling a shaped blank and a mass of mop material, means for reciprocating said plunger head to bring about the shaping of said blank, means for associating mop material with a shaped blank, and means driven by the third mentioned means for moving a shaped blank from its position of shaping to a position to be associated with said mop mass.

3. A mop making machine including a plunger head, a bed plate, means on the plunger head and bed plate for shaping a blank, means on said plunger head and bed plate for holding in position for assembling a shaped blank and a mass of mop material, means for reciprocating said plunger head to bring about the shaping of said blank, means for associating mop material with a shaped blank, means driven by the third mentioned means for moving a shaped blank from its position of shaping to a position to be associated with said mop mass, and means operating simultaneously with the movement of said blank for feeding a wire to said mop material.

4. A mop making machine including a die having a groove to receive a trough shaped blank, a punch located opposite said groove, means for locating a core on top of said punch, means for locating a mass of threads on top of said core, means for changing the relative positions of the die and punch to locate said core and mass of threads in said groove and means for closing the edges of said blank against opposite sides of said mass of threads.

5. A mop making machine including a die having a trough shaped groove open at one end, means for moving a trough shaped blank into said groove through said open end, a punch located opposite said groove, means for changing the relative positions of the die and punch to locate a mass of threads on a core within said groove and means for closing the edges of said blank against opposite sides of said mass of threads.

6. A mop making machine including a die having a groove open at one end, means for feeding trough shaped blanks in one direction into said groove through the open end of the die, a punch located opposite said groove, means for moving a core in an opposite direction onto said punch, means for moving a mass of threads transversely to said core and to project it thereacross, and means for changing the relative positions of the die and punch to crimp the blank upon the mass of threads and the core.

7. A mop making machine including a die having a groove open at one end, means for moving a trough-shaped blank in one direction into said groove through the open end of the die, a punch located opposite said groove, means for moving a core in an opposite direction on to said punch to associate said core with said blank and with a mass of threads supplied to the blank, and means for changing the relative positions of the die and punch to crimp the blank upon the mass of threads and core.

8. A mop making machine including means for channeling blanks, means for crimping channeled blanks to secure to each of the same a thread mass and a core, means for feeding a channeled blank from the channeling means in one direction into said crimping means, means for feeding a core in a different direction into assembling position with respect to said crimping means, means for actuating both of said feeding means simultaneously, and means for feeding a thread mass into assembling position with respect to the crimping means between the channeled blank and the core.

9. A mop making machine including die and punch mechanism for channeling blanks, pivoted forming means for crimping channeled blanks to secure to each of the same a thread mass and a core, means for simultaneously actuating both of said means, means for feeding a channeled blank from the channeling means in one direction into said crimping means, means for feeding a core in a different direction into assembling position with respect to said crimping means, means for actuating both of said feeding means simultaneously, and means for feeding a thread mass into assembling position with respect to the crimping means between the channeled blank and the core.

10. A mop making machine including means for channeling blanks, means for crimping channeled blanks to secure to each of the same a thread mass and a core, means for feeding a channeled blank from the channeling means in one direction into said crimping means, means for feeding a core in a different direction into assembling position with respect to said crimping means, means for feeding a thread mass in still a different direction into assembling position with respect to said crimping means, and means for actuating all of said feeding means simultaneously.

11. A mop making machine including means for channeling blanks, means for crimping channeled blanks to secure to each of the same a thread mass and a core, means for feeding a channeled blank from the channeling means in one direction into said crimping means, means for feeding a core in a different direction into assembling position with respect to said crimping means, means for actuating both of said feeding means simultaneously, means for feeding a thread mass into assembling position with respect to the crimping means between the channeled blank and the core, means for actuating the thread mass feeding means, and a single driven member connected to both of said actuating means.

12. A mop making machine including means for channeling blanks, means for crimping channeled blanks to secure to each of the same a thread mass and a core, means for feeding a channeled blank from the channeling means in one direction into said crimping means, means for feeding a core in a different direction into assembling position with respect to said crimping means, means for actuating both of said feeding means simultaneously, means for feeding a thread mass into assembling position with respect to the crimping means between the channeled blank and the core, and means for moving the positioned core and a portion of the positioned thread mass into the channel of said blank.

13. A mop making machine including means for channeling blanks, means for crimping channeled blanks to secure to each of the same a thread mass and a core, means for feeding the channeled blank from the channeling means in one direction into said crimping means, means for feeding a core in a different direction into assembling position with respect to said crimping means, means for actuating both of said feeding means simultaneously, means for feeding a thread mass into assembling position with respect to the crimping means between the channeled blank and the core, means for actuating the thread mass feeding means, a single driven member connected to both of said actuating means, and means for moving the positioned core and a portion of the positioned thread mass into the channel of said blank.

14. A mop making machine including a die having a groove, means for feeding channeled blanks in one direction into said groove, a punch located opposite said groove, means for feeding a core in a different direction between said punch and groove, means for feeding a thread mass between and transversely of the open side of said groove and the core, and means for changing the relative positions of the die and punch to insert the thread mass and core within the channeled blank, and means to crimp the blank upon the thread mass and the core.

15. A mop making machine including a die having a groove, means for feeding channeled blanks in one direction into said groove, a punch located opposite said groove, means for feeding a core in a different direction between said punch and groove, means for feeding a thread mass between and transversely of the open side of the groove and the core, means for operating all of said feeding means simultaneously, and means for changing the relative positions of the die and punch to insert the thread mass and core within the channeled blank, and means to crimp the blank upon the thread mass and the core.

16. A mop making machine including a die having a groove, means for feeding channeled blanks in one direction into said groove, a punch located opposite said groove, means for feeding a core in a different direction between said punch and groove, means for feeding a thread mass between and transversely of the groove and the core, a single cam for actuating said blank and core feeding means, a cam for actuating said thread mass feeding means, and a single driven member connected to both of said cams and means for changing the relative positions of the die and punch to insert the thread mass and core within the channeled blank and means to crimp the blank upon the thread mass and the core.

17. A mop making machine comprising means for channeling blanks, means for crimping channeled blanks to secure to each of the same a thread mass and a core, a hopper for said blanks, a core web, a thread mass web, means for feeding blanks from said hopper to the channeling means, means for feeding channeled blanks from the channeling means to the crimping means, means for feeding core material from its web to the crimping means, means for feeding thread mass from its web to the crimping means, means for severing the core material into core lengths substantially equal to the length of a blank, a single driven member for operating all of said feeding means, and a single driven member for operating said channeling means, said crimping means, and said core severing means.

18. A mop making machine comprising means for channeling blanks, means for crimping channeled blanks to secure to each of the same a thread mass and a core, a hopper for said blanks, a core web, a thread mass web, means for feeding blanks from said hopper to the channeling means, means for feeding channeled blanks from the channeling means to the crimping means, means for feeding core material from its web to the crimping means, means for feeding thread mass from its web to the crimping means, means for severing the core material into core lengths substantially equal to the length of a blank, a single driven member for operating all of said feeding means simultaneously, a single driven member for operating said channeling means and said crimping member simultaneously, and means connecting the core severing means to the crimping means to cause the operative movement of the crimping means to actuate the severing means.

19. A mop making machine including blank feeding means for feeding a channeled blank of predetermined length to an assembly location, core feeding means for feeding independently of said blank feeding means an equal length of core wire to said location and thread feeding means for feeding independently of said blank, and core feeding means a predetermined length of thread material from a web which has a width less than the length of the blank to said assembly location; means for forcing the core wire and a transverse strip of the thread material web into the channel of the blank, means for crimping the portion of the blank registering with the thread material upon said material and said core, and means for crimping the remainder of the blank upon the core only.

GEORGE FRANKLYN MATTESON.